(12) United States Patent
Cho et al.

(10) Patent No.: US 7,891,171 B2
(45) Date of Patent: Feb. 22, 2011

(54) HYBRID CATALYST FOR NOX REDUCTION USING FUEL HYDROCARBONS AS REDUCTANT

(75) Inventors: Byong K. Cho, Rochester Hills, MI (US); Joon-Hyun Baik, Pohang (KR)

(73) Assignee: GM Global Technology Operations LLC, Detroit, MI (US)

( * ) Notice: Subject to any disclaimer, the term of this patent is extended or adjusted under 35 U.S.C. 154(b) by 812 days.

(21) Appl. No.: 11/566,693

(22) Filed: Dec. 5, 2006

(65) Prior Publication Data
US 2008/0127634 A1    Jun. 5, 2008

(51) Int. Cl.
*F01N 3/00* (2006.01)
(52) U.S. Cl. ............................. 60/286; 60/274; 60/275; 60/301; 60/303
(58) Field of Classification Search .................... 60/286, 60/295, 301, 303; 422/122, 177–183, 190, 422/312, 569; 29/890
See application file for complete search history.

(56) References Cited

U.S. PATENT DOCUMENTS

| | | | |
|---|---|---|---|
| 3,067,632 A | 12/1962 | Foerster et al. | |
| 3,701,293 A | 10/1972 | Mori et al. | |
| 3,793,909 A | 2/1974 | Herman | |
| 3,817,124 A | 6/1974 | Mori et al. | |
| 3,824,876 A | 7/1974 | Mori et al. | |
| 4,377,095 A | 3/1983 | Murakami et al. | |
| 5,460,579 A | 10/1995 | Kappel et al. | |
| 6,176,078 B1 * | 1/2001 | Balko et al. | 60/274 |
| 6,284,211 B1 * | 9/2001 | Miyadera et al. | 423/239.1 |
| 6,645,448 B2 * | 11/2003 | Cho et al. | 423/239.2 |
| 6,957,528 B1 * | 10/2005 | Cho | 60/275 |
| 2004/0042947 A1 * | 3/2004 | Hoard et al. | 423/239.1 |

FOREIGN PATENT DOCUMENTS

| | | |
|---|---|---|
| DE | 15 05 724 A1 | 8/1970 |
| DE | 40 28 152 A1 | 3/1991 |

(Continued)

OTHER PUBLICATIONS

Kwak J H et al., "Nonthermal Plasma-Assisted Catalytic NOx Reduction over Ba-Y, Fau: The Effect of Catalyst Preparation", Journal of Catalysis, Academic Press, vol. 220, No. 2, Duluth, MN, Dec. 10, 2003, pp. 291-298, XP004473307, ISSN:0021-9517.*

(Continued)

*Primary Examiner*—Thomas E Denion
*Assistant Examiner*—Diem Tran

(57) ABSTRACT

A method for reducing nitrogen oxides including NO and NO2 in an exhaust stream also comprising oxygen, carbon monoxide and hydrocarbons at a temperature above about 150° C., the method including in embodiments oxidizing NO in the exhaust stream to NO2; reforming raw diesel fuel to produce OHC's from the fuel; adding diesel fuel hydrocarbons and their oxygenates to the exhaust stream for the reduction of nitrogen oxides; and contacting the exhaust stream with a reduction hybrid catalyst comprising BaY—Ag/Al2O3 to reduce the nitrogen oxides to N2. The method reduces NOx initially through the (HC+OHC)/SCR process producing N2, while also producing NH3 as a byproduct over Ag/Al2O3. The NH3 subsequently reduces NOx over the BaY—Ag/Al2O3 hybrid catalyst through the NH3/SCR process, producing more N2 and thereby enhancing the NOx reduction efficiency of the hybrid catalyst system.

38 Claims, 9 Drawing Sheets

FOREIGN PATENT DOCUMENTS

| | | |
|---|---|---|
| DE | 43 15 727 A1 | 11/1994 |
| DE | 199 12 481 A1 | 9/2000 |
| EP | 0 433 619 A | 6/1991 |
| EP | 1 222 952 A | 7/2002 |
| GB | 1 308 003 A | 2/1973 |
| JP | 09 103649 A | 4/1997 |
| WO | WO 2005/060446 A | 7/2005 |
| WO | WO 2006/048728 A | 5/2006 |

OTHER PUBLICATIONS

Hoard J W, "Two-Stage Plasma Catalysis for Diesel NOx Emission Control", Journal of Advanced Oxidation Technologies, STI. Science Technology Integration, London, CA, Jan. 1, 2003, pp. 158-165, vol. 6, No. 2, XP009108901 ISSN: 1203-8407. See abstract and Figure 4.

Kwak J H et al., "Nonthermal Plasma-Assisted Catalytic NOx Reduction over Ba-Y, Fau: The Effect of Catalyst Preparation", Journal of Catalysis, Academic Press, vol. 220, No. 2, Duluth, MN, Dec. 10, 2003, pp. 291-298, XP004473307, ISSN:0021-9517. See Abstract and Paragraph [0002].

Rappe et al., "Combination of Low and High Temperature Catalytic Materials to Obtain Broad Temperature Coverage for Plasma-Facilitated NOx Reduction", Catalysis Today, Elsevier, vol. 89, No. 1-2, Feb. 29, 2004, pp. 143-150, XP009108878 ISSN: 0920-5861. See Abstract, Paras. [02.2], [03.1], [03.2], Figs. 1, 5.

Iwamoto M et al., "Oxidation of NO To NO2 on a PT-MFI Zeolite and Subsequent Reduction of NOx by C2H4 on an In-MFI Zeolite: a Novel De-Nox Strategy in Excess Oxygen", Chemical Communications-Chemcom, Royal Society of Chemistry, GB, Jan. 1, 1997, pp. 37-38, XP000889461 ISSN: 1359-7345. See: the whole document.

\* cited by examiner

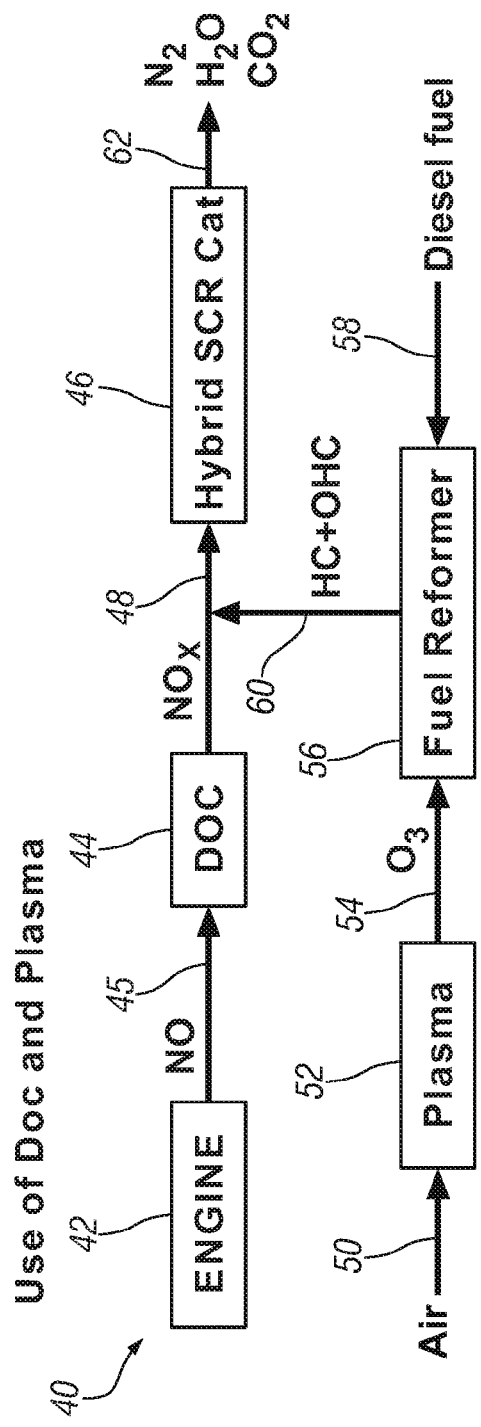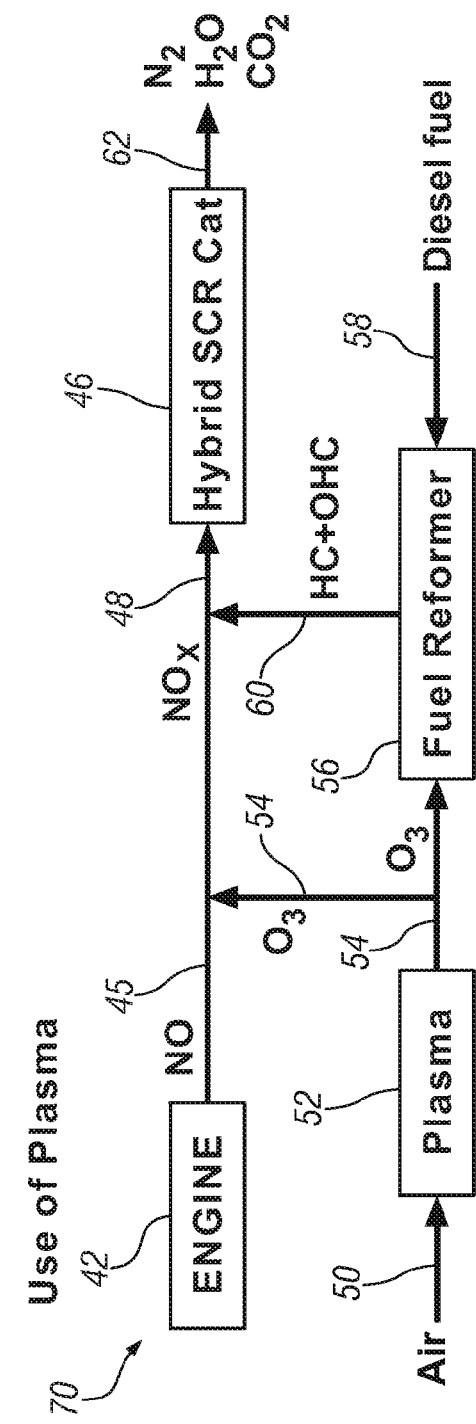
FIG. 9
FIG. 10

HYBRID CATALYST FOR NOX REDUCTION USING FUEL HYDROCARBONS AS REDUCTANT

TECHNICAL FIELD

The present disclosure relates generally to treatment of exhaust gas from a hydrocarbon fueled power source, such as a diesel engine, operated with a fuel lean combustion mixture. More particularly, the present disclosure relates to treating the NOx content of the exhaust with a hybrid catalyst for selective catalytic reduction (SCR) of NOx.

BACKGROUND OF THE INVENTION

Diesel engines are operated at higher than stoichiometric air to fuel mass ratios for improved fuel economy. Such lean-burning engines produce a hot exhaust with a relatively high content of oxygen and nitrogen oxides (NOx). The temperature of the exhaust from a warmed up diesel engine is typically in the range of about 200° C. to about 400° C. and has a representative composition, by volume, of about 10% to about 17% oxygen, about 3% carbon dioxide, about 0.1% carbon monoxide, about 180 parts per million (ppm) hydrocarbons, about 235 ppm NOx and the balance nitrogen and water.

These NOx gases, typically comprising nitric oxide (NO) and nitrogen dioxide (NO2) are difficult to reduce to nitrogen (N2) because of the high oxygen (O2) content in the hot exhaust stream. Existing NOx reduction technologies, such as lean NOx trap technology (LNT) and urea/SCR technology, can provide some suitable NOx reduction performance under certain conditions. However, both LNT and urea/SCR technologies have their inherent drawbacks. For example, the LNT technology requires a large amount of noble metal catalysts and a sophisticated engine control technology, while the urea/SCR technology requires an onboard urea tank as well as a urea distribution infrastructure.

Methods to reduce these NOx gases include, for example, U.S. Pat. No. 6,936,562 of Byong Kwon Cho et al., entitled "Hydrothermally Stable Catalyst for Improved Lean NOx Reduction," which is hereby incorporated by reference herein in its entirety, which describes in the abstract certain metal-exchanged SUZ-4 zeolites that have catalytic activity for the reduction of NOx in the exhaust of a hydrocarbon or alcohol fueled engine operated under fuel lean conditions. Initially the SUZ-4 zeolite contains alkali metal cations such as Li+, Na+, K+ and/or Cs+. These alkali metal cation-containing zeolites are partially exchanged with at least one of copper (II), silver (I), iron (III) or cobalt (II) ions. The resulting partially exchanged SUZ-4 zeolites display such activity and are stable under extreme hydrothermal aging conditions. See also U.S. Pat. No. 6,645,448 of Byong Kwon Cho et al., entitled "Hydrothermally Stable Catalyst for Improved Lean NOx Reduction," which is hereby incorporated by reference herein in its entirety.

U.S. Pat. No. 6,957,528 of Byong Kwon Cho, entitled "NO Reduction With Diesel Fuel Reformed by Nonthermal Hyperplasma," which is hereby incorporated by reference herein in its entirety, describes in the abstract the reduction of NOx in diesel engine exhaust gas, typically at about 200° C. to 400° C., accomplished using a dual bed NaY—CuY zeolite reduction catalyst. The effectiveness of the catalyst in reducing the nitrogen oxides is markedly increased by the separate and sequential additions of plasma-reformed diesel fuel and ozone to the exhaust before it contacts the powdered catalyst. Reformed diesel fuel is obtained by withdrawing fuel from on-board storage, heating the withdrawn volume and stripping a more volatile fraction with air and passing the air/volatile diesel fuel fraction through a non-thermal plasma reactor. Ozone is obtained by blowing ambient air through a second non-thermal plasma reactor.

Illustrated in U.S. Pat. No. 7,093,429 of Byong Kwon Cho, entitled 'Reforming Diesel Fuel for NOx Reduction,' the disclosure of which is totally incorporated herein by reference, is, in embodiments, a method of using diesel fuel in the selective catalytic reduction (SCR) of NOx where the diesel fuel is fractionated and reformed by an air-plasma stream from an efficient nonthermal plasma generator.

Illustrated in U.S. patent application Ser. No. 11/155,179, of Byong Kwon Cho et al., filed on Jun. 17, 2005, entitled 'Continuous Reforming of Diesel Fuel for NOx Reduction,' the disclosure of which is totally incorporated herein by reference, describes, in embodiments, a method and equipment for continuous fractionation and reformation of diesel fuel with air plasma to produce partially oxygenated hydrocarbons for NOx reduction.

Illustrated in U.S. Pat. No. 7,090,811 of Byong Kwon Cho et al., entitled 'Method of Reducing NOx in Diesel Engine Exhaust,' the disclosure of which is totally incorporated herein by reference, is, in embodiments, a method of reducing NOx content in diesel engine exhaust using ethanol as the reductant for selective catalytic reduction of NOx.

The appropriate components and process aspects of each of the foregoing U.S. Patents and Applications may be selected for the present disclosure in embodiments thereof.

SUMMARY OF THE INVENTION

Embodiments disclosed herein include a method for reducing NOx initially through a hydrocarbon plus oxygenated hydrocarbon/selective catalytic reduction (HC+OHC/SCR) process producing N2, while also producing NH3 as a byproduct over Ag/Al2O3. The NH3 subsequently reduces NOx over an ammonia/SCR hybrid catalyst, for example, in embodiments a BaY—Ag/Al2O3 hybrid catalyst, through the NH3/SCR process, producing more N2 and thereby enhancing the NOx reduction efficiency of the hybrid catalyst system. NH3 is prepared from diesel fuel thereby eliminating the need for an onboard urea supply or urea distribution infrastructure.

In embodiments, ammonia (NH3), the essential NOx reductant for the urea/SCR (i.e., NH3/SCR) catalyst, is produced onboard from diesel fuel hydrocarbons and their oxygenates, thereby eliminating the need for an onboard urea supply or urea distribution infrastructure for the catalyst.

Embodiments disclosed herein include a method for reducing nitrogen oxides including NO and NO2 in an exhaust stream also comprising oxygen, carbon monoxide and hydrocarbons at a temperature above about 150° C., the method comprising oxidizing NO in the exhaust stream to NO2; adding diesel fuel hydrocarbons and their oxygenates to the exhaust stream for the reduction of nitrogen oxides; and contacting the exhaust stream with a hybrid reduction catalyst comprising an alkali metal or an alkaline earth metal, zeolite, a transition metal, and a metal oxide to reduce the nitrogen oxides to N2.

Embodiments disclosed herein include a catalytic method for reducing nitrogen oxides including NO and NO2 in an exhaust stream also comprising oxygen, carbon monoxide and hydrocarbons at a temperature above about 150° C., the method comprising oxidizing NO in the exhaust stream to NO2; adding reformed diesel fuel hydrocarbons to the exhaust stream for the reduction of nitrogen oxides; and contacting the exhaust stream with a hybrid reduction catalyst comprising BaY—Ag/Al2O3 to reduce the nitrogen oxides to N2.

Embodiments disclosed herein include a method for preparing a hybrid NOx reduction catalyst comprising mixing an alkali metal or alkaline earth metal supported on a zeolite and a transition metal supported on a metal oxide, to form a homogeneous physical mixture; compressing the homogenous physical mixture to form a wafer; annealing the wafer to form the hybrid catalyst comprising alkali metal or alkaline earth metal on zeolite and transition metal on metal oxide.

Embodiments disclosed herein further include a method for preparing a hybrid NOx reduction catalyst, the method comprising mixing BaY and Ag/Al2O3 to form a homogeneous physical mixture; compressing the homogenous physical mixture to form a wafer; and annealing the wafer to form the hybrid catalyst comprising BaY—Ag/Al2O3.

Embodiments disclosed herein further include a method for reforming raw diesel fuel to produce partially oxygenated hydrocarbons, the method comprising partial oxidation of diesel fuel using air plasma containing ozone; flowing the air plasma through the liquid diesel fuel reservoir; and contacting the air plasma stream with the liquid diesel fuel for partial oxidation of fuel hydrocarbons by generating fine air plasma bubbles in the liquid fuel.

Embodiments disclosed herein further include a NOx reduction catalyst for a hydrocarbon-fueled automotive engine operated at a fuel-lean air-to-fuel ratio, the catalyst comprising a hybrid catalyst comprising BaY—Ag/Al2O3.

BRIEF DESCRIPTION OF THE DRAWINGS

FIG. 9 is a schematic flow diagram of possible vehicle implementation options for the hybrid SCR catalyst for NOx reduction in the diesel exhaust with a diesel oxidation catalyst; and FIG. 10 is a schematic flow diagram of possible vehicle implementation options for the hybrid SCR catalyst for NOx reduction in the diesel exhaust without a diesel oxidation catalyst.

DESCRIPTION OF THE PREFERRED EMBODIMENT

Figure 1:
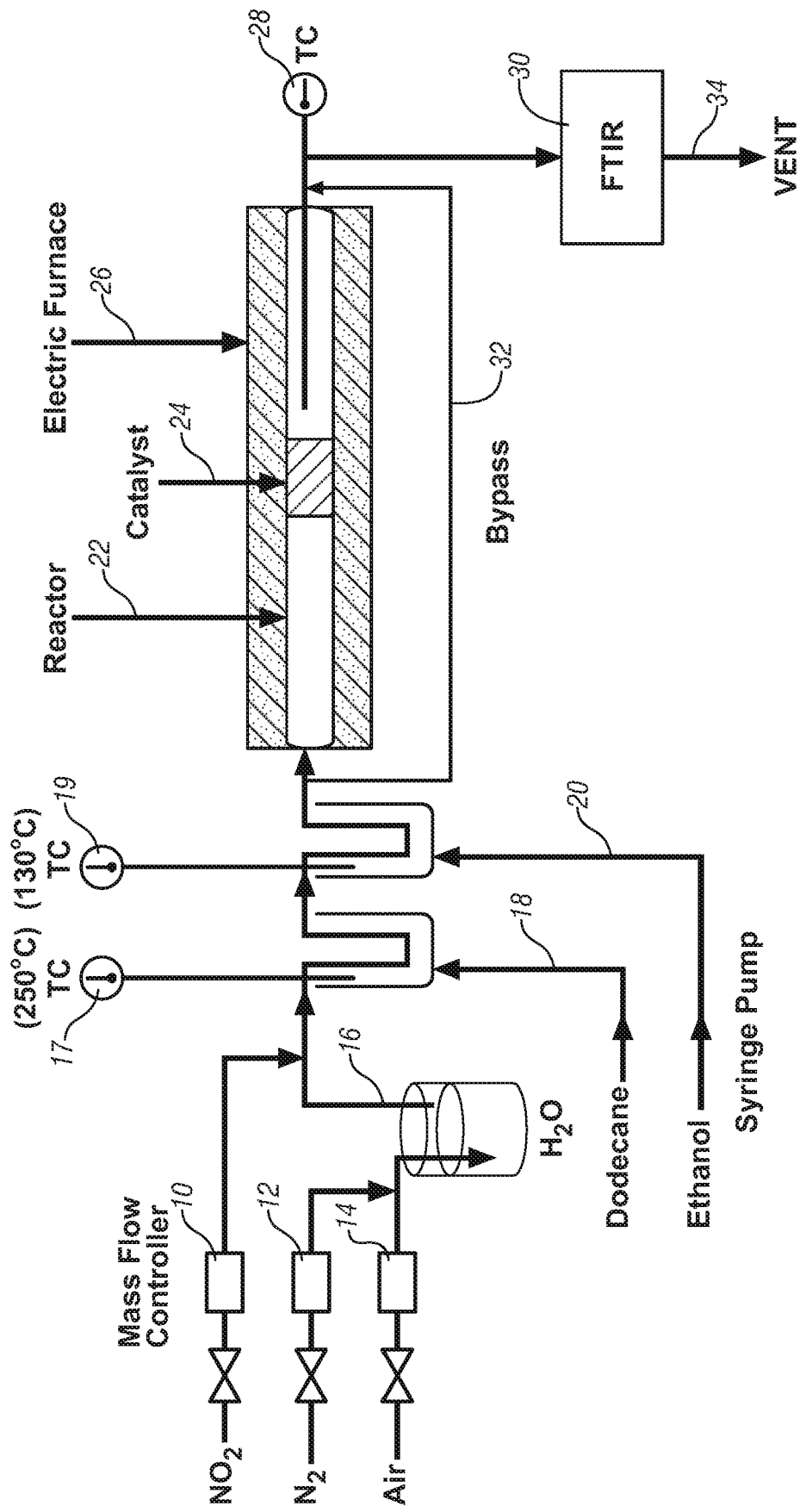
FIG. 1 is a schematic flow diagram of a laboratory reaction system.

In embodiments, a hybrid NOx reduction catalyst and method for preparing a hybrid NOx reduction catalyst, are disclosed. Embodiments disclosed herein include a method of reducing nitrogen oxides including NO and NO2 in an exhaust stream also comprising oxygen, carbon monoxide and hydrocarbons at a temperature above about 150° C., the method comprising oxidizing NO in the exhaust stream to NO2; adding diesel fuel hydrocarbons and their oxygenates to the exhaust stream for the reduction of nitrogen oxides; and contacting the exhaust stream with a hybrid reduction catalyst comprising an alkali metal or an alkaline earth metal, zeolite, transition metal, and metal oxide to reduce the nitrogen oxides to N2.

The components of the hybrid catalyst can be selected from any suitable components including but not limited to the following. In embodiments, the alkali metal is selected from the group consisting of Li, Na, K, Rb, Cs, Fr, Cs, Fr, and mixtures and combinations thereof. In embodiments, the alkaline earth metal is selected from the group consisting of Be, Mg, Ca, Sr, Ba, Ra, and mixtures and combinations thereof.

Suitable zeolites include, for example, but are not limited to, X, Y, ZSM-5, ZSM-57, SUZ-4, and mixtures and combinations thereof. Zeolites can be selected from any suitable zeolite, for example, but not limited to, zeolites referred to in U.S. Pat. No. 6,632,765, the disclosure of which is incorporated by reference herein in its entirety. Examples of useful large pore zeolites include, but are not limited to, ZSM-3, ZSM-4, ZSM-10, ZSM-12, ZSM-20, zeolite beta, zeolite omega, zeolite L, zeolite X, zeolite Y, REY, USY, RE-USY, mordenite, and mixtures and combinations thereof. ZSM-3 is described in U.S. Pat. No. 3,415,736; ZSM-4 is described in UK Application No. 1,117,568; ZSM-10 is described in U.S. Pat. No. 3,692,470; ZSM-12 is described in U.S. Pat. No. 3,832,449; ZSM-20 is described in U.S. Pat. No. 3,972,983; Zeolite beta is described in U.S. Pat. No. Re. 28,341 (of original U.S. Pat. No. 3,308,069); Zeolite omega is described in U.S. Pat. No. 4,241,036; Zeolite L is described in U.S. Pat. No. 3,216,789; Zeolite X is described in U.S. Pat. No. 2,882,244; Zeolite Y is described in U.S. Pat. No. 3,130,007; the disclosures of each of which are hereby incorporated by reference herein in their entireties. Examples of useful intermediate pore zeolites include, but are not limited to, ZSM-5, ZSM-57, SUZ-4, and mixtures and combinations thereof. ZSM-5 is described in U.S. Pat. No. Re. 29,948 (of original U.S. Pat. No. 3,702,886); SUZ-4 is described in EP Application No. 353,915; the disclosures of each of which are totally incorporated by reference herein.

Suitable transitions metals can be selected from, but are not limited to, the group consisting of Ag, Cu, Co, Ni, Fe, Mn, Cr, Mo, V, and mixtures and combinations thereof.

Any suitable metal oxide can be used in embodiments herein. For example, in embodiments, the metal oxide is selected from the group consisting of, but not limited to, $Al_2O_3$, $SiO_2$, $TiO_2$, $SnO_2$, MgO, and mixtures and combinations thereof.

A method of preparing a hybrid catalyst NOx reduction catalyst comprises, in embodiments, mixing BaY and Ag/Al2O3 to form a homogeneous physical mixture; compressing the homogenous physical mixture to form a wafer; and annealing the wafer to form the hybrid catalyst comprising BaY—Ag/Al2O3. Oxidizing NO in the exhaust stream to NO2 can comprise, in embodiments, for example, treating the exhaust stream with an oxidation catalyst or passing air through a non-thermal plasma reactor to generate an ozone containing plasma and adding the plasma to the exhaust stream for oxidation of NO to NO2. In embodiments, oxidizing NO in the exhaust stream to NO2 comprises treating the exhaust stream with an oxidation catalyst including, but not limited to, for example, an oxidation catalyst selected from the noble metals group including Pt, Pd, Rh, and mixtures and combinations thereof. In embodiments, ethanol can be added to the exhaust stream as ethanol vapor in an air stream. Alternately, ethanol, dodecane, or a mixture thereof can be added to the exhaust stream. In embodiments, the method comprises reducing nitrogen oxides including NO and NO2 in an exhaust stream also comprising oxygen, carbon monoxide and hydrocarbons at a temperature above about 200° C., above about 225° C., or above about 250° C. In embodiments, reducing nitrogen oxides including NO and NO2 in an exhaust stream comprises a continuous NOx reduction. In embodiments, the hybrid catalyst herein continuously produces NH3 as a by-product. In embodiments, the hybrid catalyst is a BaY—Ag/Al2O3 hybrid catalyst, the hybrid catalyst continuously produces NH3 as a by-product and the produced NH3 continuously reacts with NOx over the BaY—Ag/Al2O3 hybrid catalyst to produce N2. Further, in embodiments, the emission level of harmful nitrogen-containing species including NH3, HCN and N2O in an outlet stream of the hybrid catalyst is suppressed or eliminated.

In embodiments, the hybrid catalyst is prepared from an alkali metal or alkali earth metal, a zeolite, a transition metal, and a metal oxide through an aqueous ion exchange and wet impregnation followed by mixing to form a homogeneous physical mixture; compressing the homogenous physical mixture to form a wafer; annealing the wafer to form the hybrid catalyst comprising alkali metal or alkali earth metal-zeolite-transition metal/metal oxide. In embodiments, the hybrid catalyst is BaY—Ag/Al2O3 prepared by mixing BaY and Ag/Al2O3 to form a homogeneous physical mixture; compressing the homogenous physical mixture to form a wafer; and annealing the wafer to form the hybrid catalyst comprising BaY—Ag/Al2O3. The BaY can be prepared by a multiple ion-exchange process. In embodiments, BaY is prepared by a multiple ion exchange process using a Ba(NO3)2 precursor at a temperature of from about 20° C. to about 100° C. The process was repeated three times to achieve 10 weight % Ba on zeolite Y. Similarly, the Ag/Al2O3 can be prepared by any suitable method, for example, in embodiments, by an incipient wetness impregnation of Ag on γ-Al2O3 using a AgNO3 precursor to obtain 2 weight % Ag/Al2O3.

In embodiments, the catalysts are calcined prior to mixing. For example, the BaY and Ag/Al2O3 are calcined prior to mixing. For example, both catalysts can be calcined at a temperature of about 500° C. for about 4 hours.

Typically, the method further includes forming the BaY—Ag/Al2O3 (or other catalyst component) wafer into a powder; and optionally screening the powder to a selected size, for example, the powder can be screened to a size of from about 20 to about 30 mesh.

In embodiments, the hybrid catalyst comprises from about 10 to about 90 weight % BaY and from about 90 to about 10 weight % Ag/Al2O3. The BaY and Ag/Al2O3 powders are ground and mixed together in a suitable mixing ratio typically in the weight ratio range of from about 1:9 to about 9:1, although the weight ratios can be outside of these ranges, for example in an agate mortar or a ball mill to form a fine homogeneous physical mixture. The mixed powder is compressed under a pressure suitable to form a wafer, typically in the range of about 5 to about 15 ton pressure. For example, in embodiments, the hybrid catalyst wafer is compressed at a pressure of from about 5 tons to about 15 tons, or about 10 tons. The wafer can be annealed at high temperature in the range of from about 400 to about 700° C. for a suitable time, for example, from about 5 to about 30 hours under atmospheric conditions, although not limited to these ranges. For example, the present BaY—Ag/Al2O3 wafer was annealed at 500° C. for 20 hours under atmospheric conditions. Other suitable pressures and temperature ranges can be selected. In embodiments, the wafer is formed into a powder and optionally, the powder is screened to a selected size. For example, in embodiments, the annealed wafer can then be crushed and screened, as desired, to a selected mesh size, for example a 20 to 30 mesh size, before being packed into the reactor. Prior to activity measurements, the packed bed reactor was pretreated at 500° C. for one hour under the standard reaction conditions as shown in Table 1.

A practice of the invention is illustrated schematically in FIG. 1. Excellent NOx reduction performance (close to about 90% average NOx conversion) was demonstrated in laboratory reactor experiments over a wide temperature range between about 225° C. to about 400° C. using simulated diesel engine exhaust compositions. Table 1 provides the experimental conditions used to demonstrate the NOx conversion performance of the present hybrid catalyst in the laboratory reactor experiments. Diesel engines are typically operated at air-to-fuel mass ratios that are considerably higher than the stoichiometric ratio of air to fuel and the exhaust gas contains an appreciable amount of unreacted O2 as well as N2 (from the air). The temperature of the exhaust from a warmed-up engine is typically in the range of about 200° C. to about 400° C. The disclosure is illustrated in the case of a diesel engine but it is to be understood that the subject method and hybrid catalyst could be used to treat the exhaust of other lean-burn hydrocarbon-fueled power sources if diesel fuel is available for the exhaust treatment. In diesel engine exhaust, in addition to O2 and N2, the hot gas also contains CO, CO2, H2O and hydrocarbons (some in particulate form) that are not completely burned. Embodiments disclosed herein include a method for reducing nitrogen oxides including NO and NO2 in an exhaust stream also comprising oxygen, carbon monoxide and hydrocarbons at a temperature above about 150° C., the method comprising oxidizing NO in the exhaust stream to NO2; adding diesel fuel hydrocarbons to the exhaust stream for the reduction of nitrogen oxides; and contacting the exhaust stream with a reduction hybrid catalyst comprising BaY—Ag/Al2O3 to reduce the nitrogen oxides to N2.

TABLE 1

| Catalyst Bed: | Hybrid-bed catalyst BaY – Ag/Al$_2$O$_3$ Dual-bed catalyst BaY + Ag/Al$_2$O$_3$ |
|---|---|
| Catalyst Temperature: | 150 to 500° C. |
| Catalyst powder: | 20/30 mesh |
| Total flow rate: | 200 cc/minute |
| Reactor space velocity: | 30,000 h$^{-1}$ |
| Feed gas composition: | 200 ppm NO$_2$ 6% O$_2$ 2.5% H$_2$O N$_2$ balance C$_1$/N = 8 133 ppm Dodecane, or 67 ppm Dodecane + 400 ppm Ethanol |

FIG. 1 illustrates a laboratory reactor system used to measure the NOx reduction performance of various catalysts in the diesel/SCR process where simulated diesel fuel was used as the reductant. In FIG. 1 mass flow controllers 10, 12, and 14 control feed reactant flow to the catalyst of NO2, N2 and oxygen (in air). Water vapor 16 is introduced by bubbling a mixture of air and nitrogen through water at room temperature, while dodecane 18 and ethanol 20 are supplied, for example by syringe pumps, at temperatures of about 250° C. and 130° C., respectively, as controlled by temperature controllers 17 and 19. Catalytic activity was measured between about 150° C. and about 500° C. in a packed-bed flow reactor 22 at atmospheric pressure. Other temperatures and pressures can be used as appropriate. The reactor was packed with a catalyst 24, and heated with an electric furnace 26 whose temperature was controlled by measuring the catalyst at the reactor outlet using a thermocouple 28. The feed reactant flow to the catalyst contained about 200 parts per million (ppm) NO2, about 6% O2, and 2.5% H2O, about 133 ppm dodecane (or a mixture of about 67 ppm dodecane and about 400 ppm ethanol) and the balance N2. Either dodecane alone or a mixture of dodecane and ethanol can be selected to maintain the carbon/NOx feed ratio of about 8. In the instant case, dodecane was used as a representative diesel fuel hydrocarbon. Alternately, a mixture of dodecane and ethanol can be used as a representative diesel fuel hydrocarbon reformed by air plasma as disclosed in commonly assigned U.S. patent application Ser. No. 11/155,179 of Byong Kwon Cho et al. entitled 'Continuous Reforming of Diesel Fuel for NOx Reduction,' which is hereby incorporated by reference herein in its entirety. Both the feed and the product composition to and form the catalytic reactor 22 were analyzed by Fourier Transform Infrared Spectroscopy (FTIR) 30 and vented through vent line 34. Bypass 32 was used to draw the reactant sample before the catalytic reactor 22.

Figure 2A:
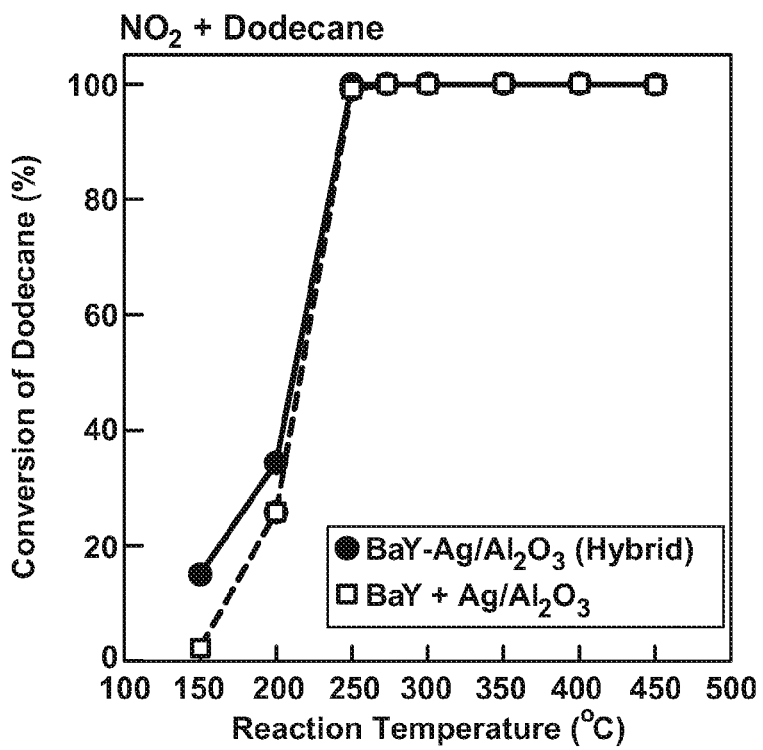
FIG. 2A is a graph showing dodecane conversion performance for a hybrid catalyst according to an embodiment of the present disclosure and a dual-bed catalyst.
Figure 2B:
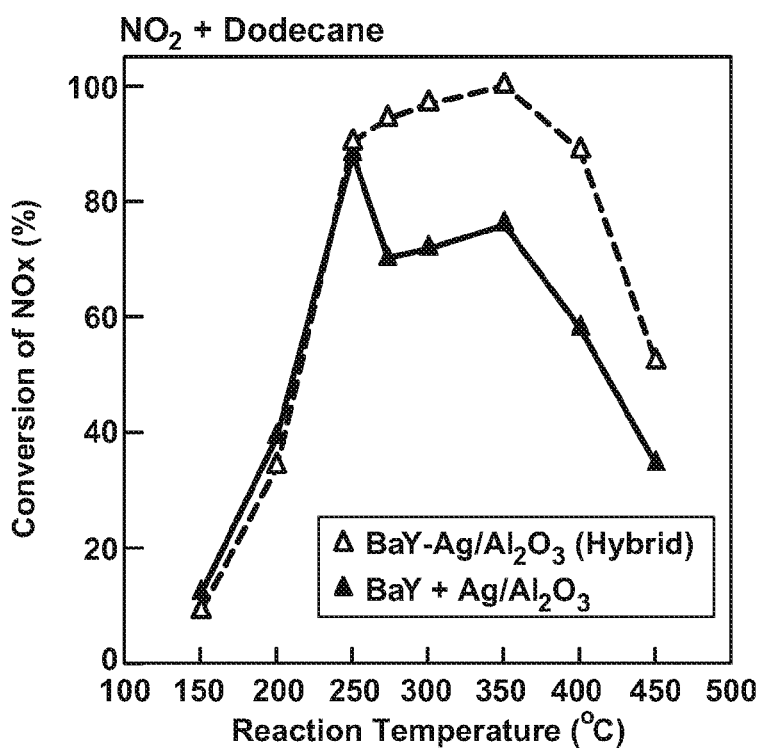
FIG. 2B is a graph showing NOx conversion performance for a hybrid catalyst according to an embodiment of the present disclosure and a dual-bed catalyst.

FIGS. 2A and 2B provide a graphic comparison of the present hybrid catalyst (BaY—Ag/Al2O3) with a dual bed catalyst (BaY and Ag/Al2O3) for hydrocarbon and NOx conversion with dodecane used as the reductant. FIG. 2A illustrates conversion of dodecane (%, y axis) versus reaction temperature (° C., x axis) and FIG. 2B illustrates conversion of NOx (%, y axis) versus reaction temperature (° C., x axis). In the dual bed catalyst, BaY is in the front bed followed by Ag/Al2O3 in the rear bed. At low temperatures, for example, temperatures below about 250° C., the dual bed catalyst shows a slightly better performance than the hybrid catalyst for both hydrocarbon and NOx conversion. At high temperatures, for example, temperatures above about 250° C., the hybrid catalyst is superior to the dual bed catalyst for NOx conversion while hydrocarbon conversion is close to 100% for both the hybrid and the dual bed catalysts.

Figure 3A:
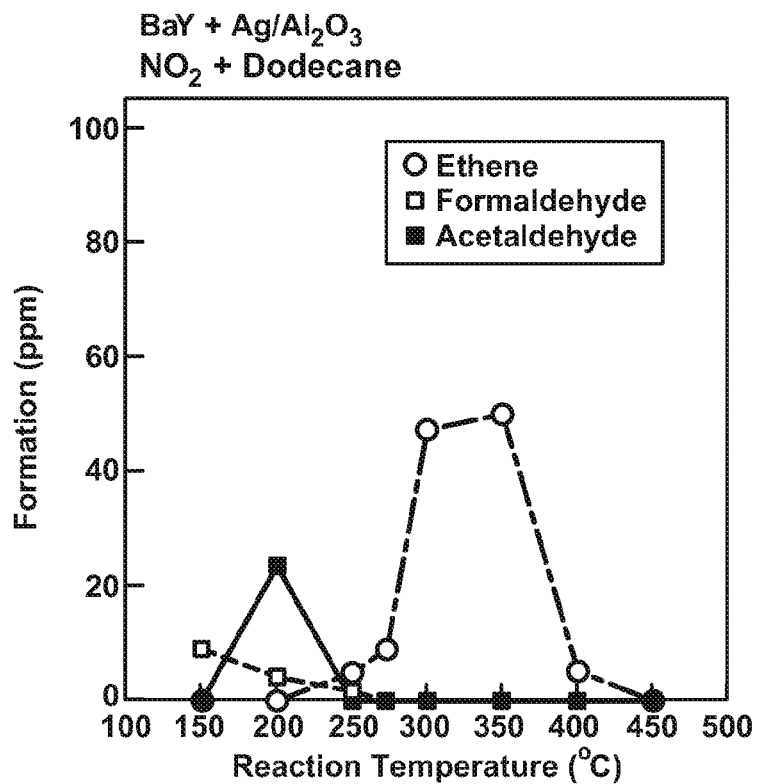
FIG. 3A is a graph showing carbon containing by-products from a dual-bed catalyst and a hybrid catalyst according to an embodiment of the present disclosure.
Figure 3B:
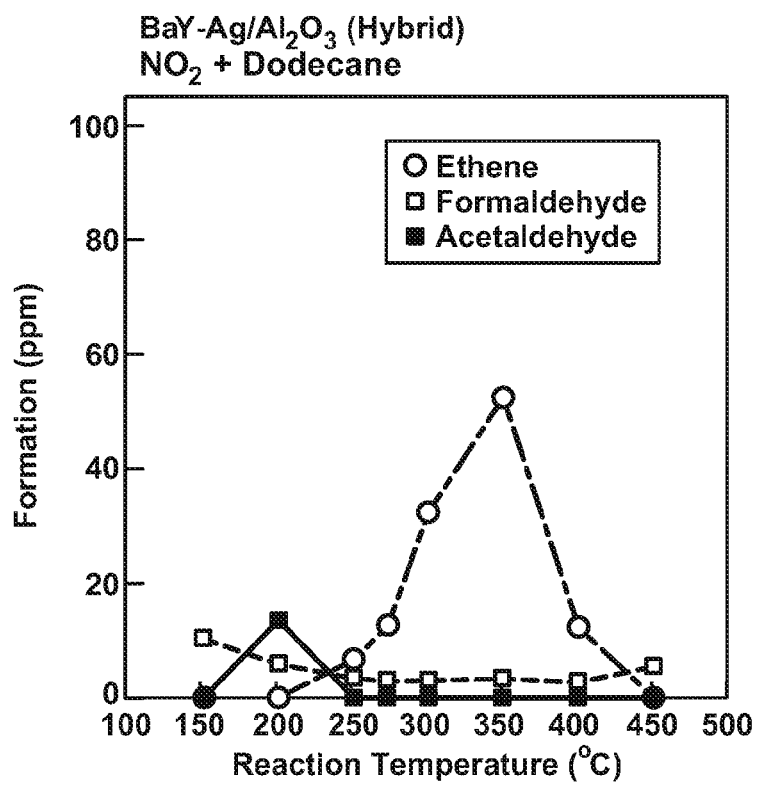
FIG. 3B is a graph showing carbon containing by-products from a dual-bed catalyst and a hybrid catalyst according to an embodiment of the present disclosure.

FIGS. 3A and 3B illustrate formation of carbon-containing byproducts—such as ethene, formaldehyde and acetaldehyde—in the dual bed catalyst and hybrid catalyst. FIG. 3A illustrates graphically formation (ppm, y axis) of carbon-containing by-products versus reaction temperature (° C., x axis) for the dual bed catalyst with BaY in the first bed and Ag/Al2O3 in the second bed. FIG. 3B illustrates graphically formation (ppm, y axis) of carbon-containing by-products versus reaction temperature (° C., x axis) for the instant hybrid catalyst. FIGS. 3A and 3B show that formation of carbon-containing by-products is similar over the dual bed and hybrid catalysts.

Figure 4A:
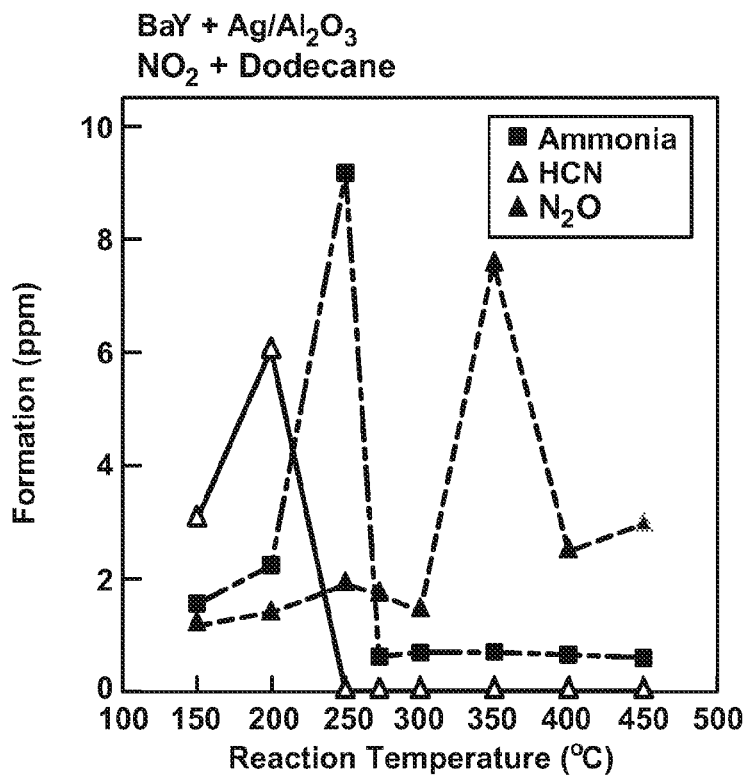
FIG. 4A is a graph showing nitrogen-containing by-products from a dual-bed catalyst and a hybrid catalyst according to an embodiment of the present disclosure.
Figure 4B:
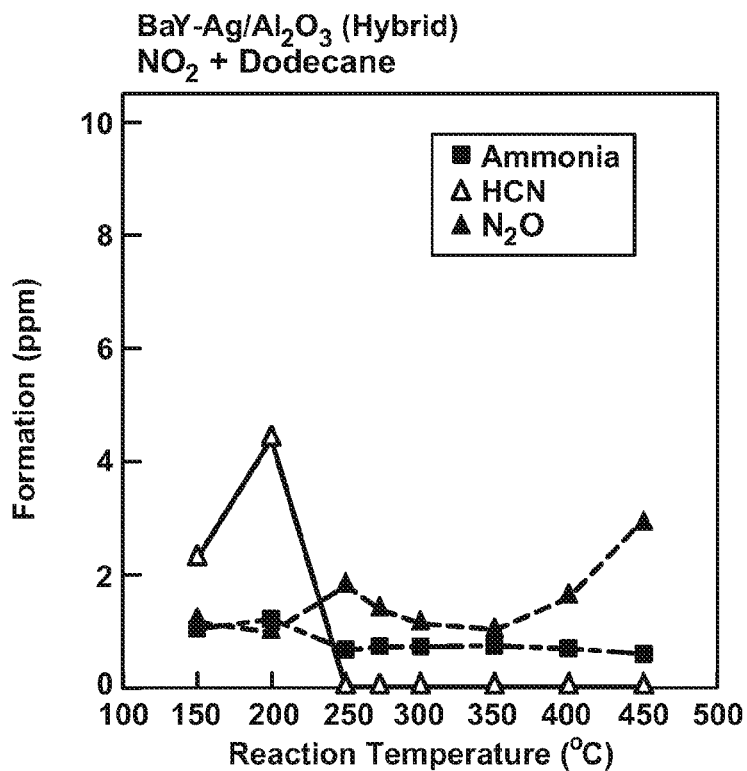
FIG. 4B is a graph showing nitrogen-containing by-products from a dual-bed catalyst and a hybrid catalyst according to an embodiment of the present disclosure.

However, FIGS. 4A and 4B show that the hybrid catalyst (FIG. 4B) produces a lesser amount of undesirable nitrogen-containing by-products such as ammonia, HCN and N2O compared to the dual bed catalyst (FIG. 4A). FIG. 4A illustrates graphically the formation of nitrogen-containing by-products (ppm, y axis) versus reaction temperature (° C., x axis) for the dual bed catalyst with BaY in the first bed and Ag/Al2O3 in the second bed. FIG. 4B illustrates graphically the formation of nitrogen-containing by-products (ppm, y axis) versus reaction temperature (° C., x axis) for the instant hybrid catalyst. Thus, FIGS. 2A, 2B, 3A, 3B, 4A and 4B show that the hybrid catalyst provides an overall NOx conversion performance superior to the dual bed catalyst. For example, the instant hybrid catalyst suppresses formation of harmful nitrogen-containing by-products compared with the dual bed catalyst.

Figure 5A:
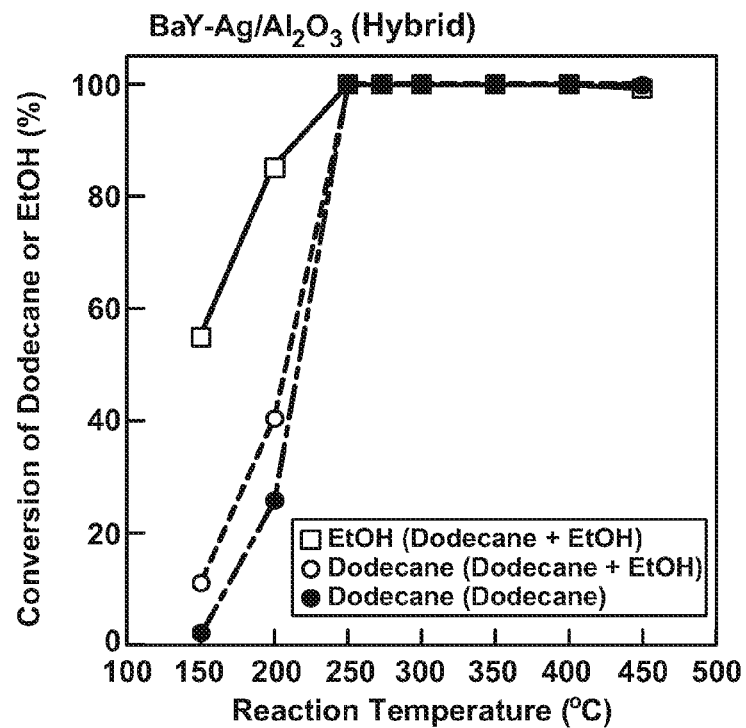
FIG. 5A is a graph showing the effect of ethyl alcohol (ethanol) on dodecane conversion.
Figure 5B:
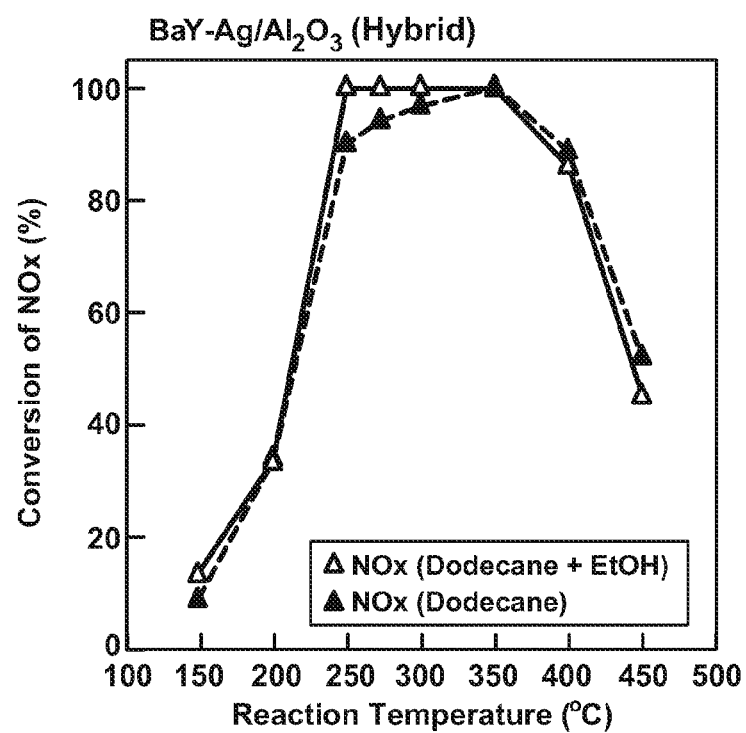
FIG. 5B is a graph showing the effect of ethyl alcohol (ethanol) on NOx conversion.

Previously, it has been shown that diesel fuel can be reformed by treating with air plasma to produce oxygenated hydrocarbons (OHC's) such as ethanol. See, for example, U.S. Pat. No. 7,093,429 of Byong Kwon Cho, entitled 'Reforming Diesel Fuel for NOx Reduction,' the disclosure of which is totally incorporated herein by reference, and U.S. patent application Ser. No. 11/155,179, of Byong Kwon Cho et al., filed on Jun. 17, 2005, entitled 'Continuous Reforming of Diesel Fuel for NOx Reduction,' the disclosure of which is totally incorporated herein by reference. In order to simulate the reformed diesel fuel, ethanol was added to dodecane to make a gaseous mixture of about 67 ppm dodecane and about 400 ppm ethanol while maintaining the C1/NOx feed ratio at 8. FIGS. 5A and 5B illustrate the effect of ethanol on hydrocarbon and NOx conversion. FIG. 5A shows graphically conversion of dodecane or ethanol (%, y axis) versus reaction temperature (° C., x axis) for a BaY—Ag/Al2O3 hybrid catalyst according to the instant disclosure. FIG. 5B shows graphically conversion of NOx (%, y axis) versus reaction temperature (° C., x axis) for a BaY—Ag/Al2O3 hybrid catalyst according to the instant disclosure. As shown in FIG. 5A, ethanol conversion is much higher than dodecane conversion and the presence of ethanol enhances the dodecane conversion at low temperatures such as temperatures below about 250° C. FIG. 5B illustrates that ethanol improves NOx conversion at low temperatures below about 350° C., but reduces the conversion performances at high temperatures above about 350° C.

Figure 6:
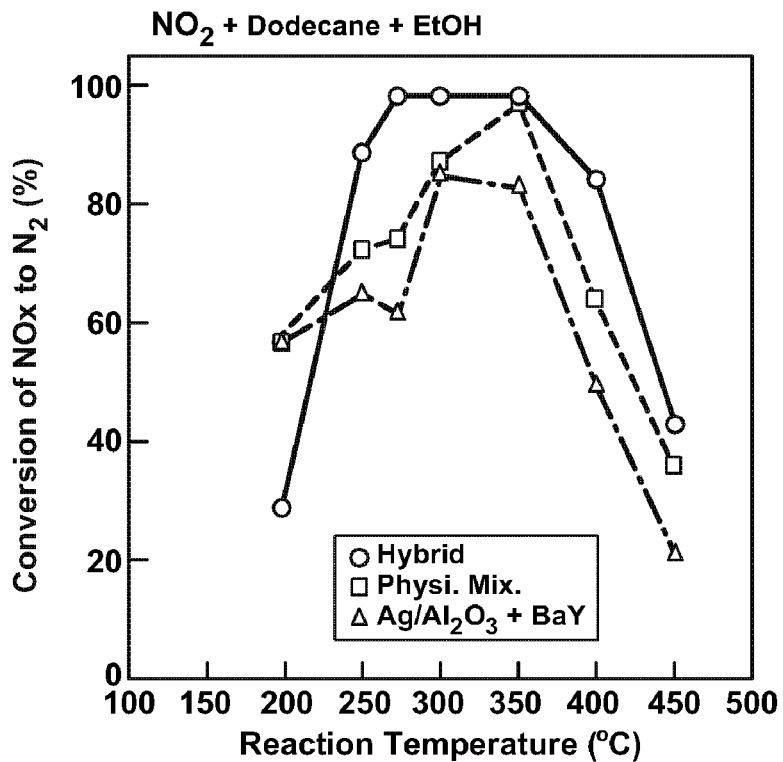
FIG. 6 is a graph showing NOx reduction to N2 for a hybrid catalyst according to an embodiment of the present disclosure, a catalyst comprising a physical mixture of Ag/Al2O3 and BaY, and a dual-bed catalyst having a first bed comprising Ag/Al2O3 and a second bed comprising BaY.

FIG. 6 provides a comparison of NOx reduction to N2 among the hybrid, dual-bed and physically mixed catalysts. FIG. 6 shows graphically conversion of NOx to N2 (%, y axis) versus reaction temperature (° C., x axis) for a BaY—Ag/Al2O3 hybrid catalyst according to the present disclosure, an Ag/Al2O3 and BaY dual-bed catalyst and physically mixed catalysts, when the feed gas mixture contained NO2, dodecane and ethanol in a composition as shown in Table 1. Having seen in FIGS. 2A, 2B, 4A and 4B that the present hybrid catalyst performs better in reducing NOx than the dual bed catalyst having BaY in the front bed and Ag/Al2O3 in the rear bed, in FIG. 6 the order of catalyst location was changed so that the Ag/Al2O3 is in the front bed and the BaY is in the rear bed. The physically mixed catalyst shown in FIG. 6 was comprised of a homogenous physical mixture of BaY powder with Ag/Al2O3 powder. Unlike the hybrid catalyst, however, the physically mixed catalyst did not go through the high pressure compacting and high temperature annealing process after the physical mixing. FIG. 6 indicates that the hybrid catalyst is better than the physically mixed catalyst which in turn is better than the dual bed catalyst for NOx reduction to N2 at high temperatures about 225° C. At low temperatures below about 225° C., both the dual bed and the physically mixed catalyst exhibit slightly better NOx reduction performances than the hybrid catalyst. That is, the hybrid system of the present disclosures achieves the best overall NOx conversion to N2 over the entire temperature range of about 150° C. to about 500° C.

Figure 7A:
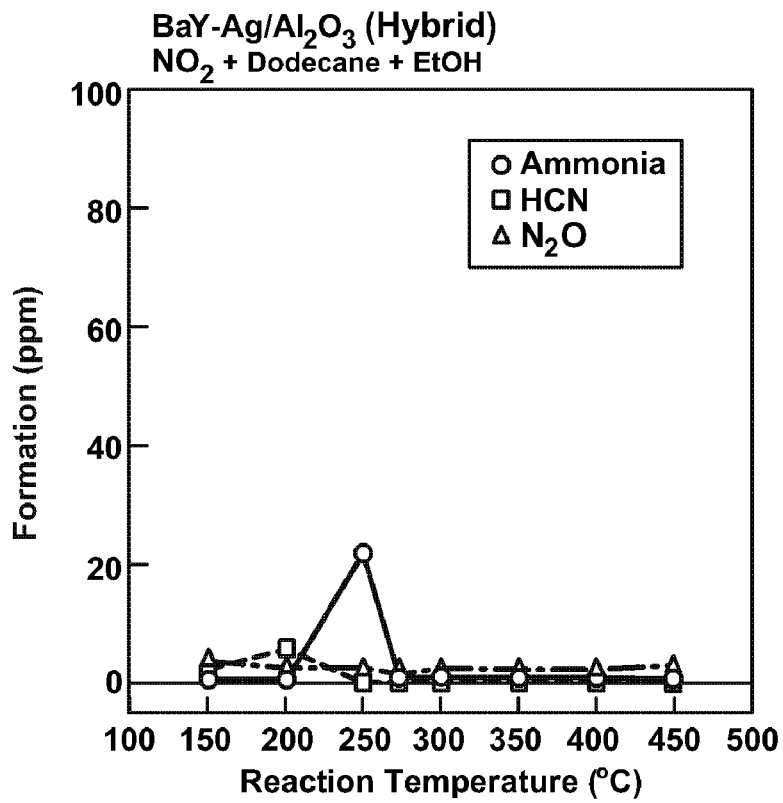
FIG. 7A is a graph showing formation of nitrogen-containing by-products versus reaction temperature for a hybrid catalyst according to an embodiment of the present disclosure.
Figure 7B:
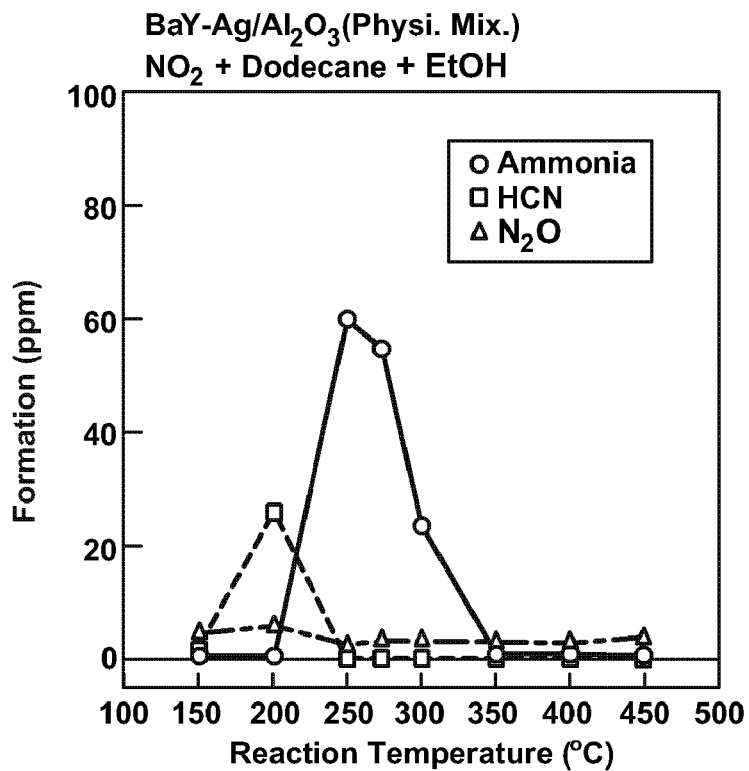
FIG. 7B is a graph showing formation of nitrogen-containing by-products versus reaction temperature for a catalyst comprising a physical mixture of Ag/Al2O3 and BaY.
Figure 7C:
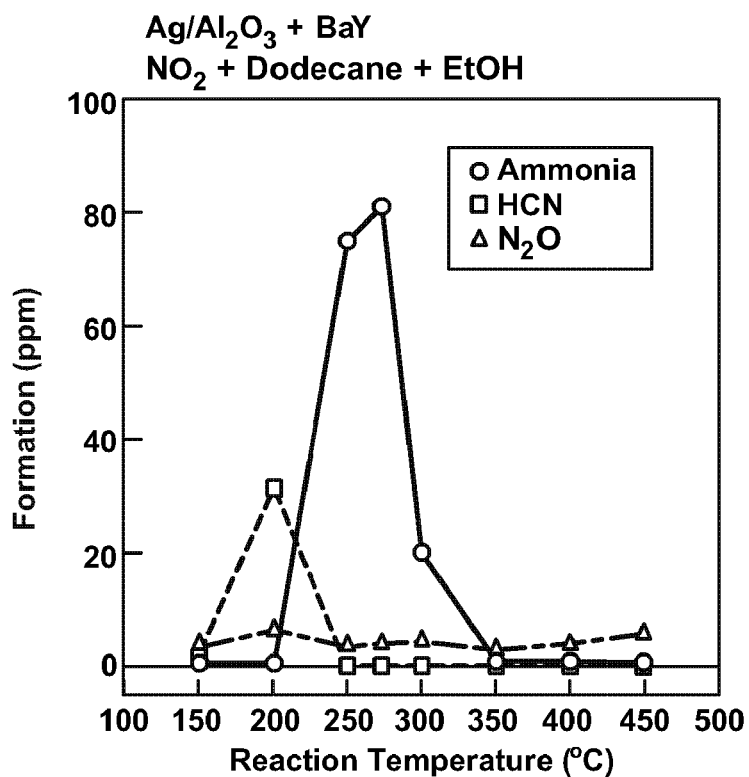
FIG. 7C is a graph showing formation of nitrogen-containing by-products versus reaction temperature for a dual-bed catalyst having a first bed comprising Ag/Al2O3 and a second bed comprising BaY.

FIGS. 7A, 7B, and 7C provide a comparison of nitrogen containing by-products formation over the three catalysts. FIG. 7A shows graphically formation (ppm, y axis) of nitrogen-containing by-products versus reaction temperature (° C., x axis) for a BaY—Ag/Al2O3 hybrid catalyst according to the present disclosure for treatment of a gas stream containing NO2, dodecane and ethanol in a composition as listed in Table 1. FIG. 7B shows graphically formation (ppm, y axis) of nitrogen-containing by-products versus reaction temperature (° C., x axis) for a physically mixed BaY and Ag/Al2O3 for treatment of a gas stream containing NO2, dodecane and ethanol in a composition as listed in Table 1. FIG. 7C shows graphically formation (ppm, y axis) of nitrogen-containing by-products versus reaction temperature (° C., x axis) for a dual bed Ag/Al2O3 and BaY catalyst with Ag/Al2O3 in the first bed and BaY in the second bed for treatment of a gas stream containing NO2, dodecane and ethanol in a composition as listed in Table 1. FIGS. 7A, 7B, and 7C demonstrate that the hybrid catalyst (FIG. 7A) suppresses the formation of undesirable nitrogen-containing by-products such as ammonia, HCN and N2O compared with the dual bed (FIG. 7C) and physically mixed (FIG. 7B) catalysts. In view of the data in FIGS. 6, 7A, 7B and 7C, it is concluded that the present hybrid catalyst is the most efficient catalyst among the three in terms of overall performance for NOx reduction over the entire temperature range. For example, in embodiments, the present hybrid catalyst makes the least amount of NH3, HCN and N2O.

Figure 8A:
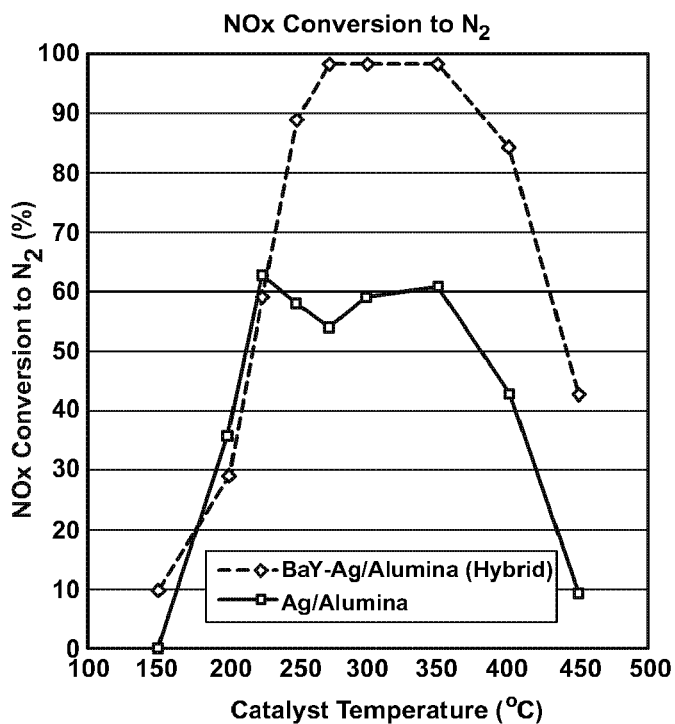
FIG. 8A is a graph comparing NOx reduction activity of Ag/Al2O3 and BaY—Ag/Al2O3 hybrid catalysts in terms of NOx conversion to N2.
Figure 8B:
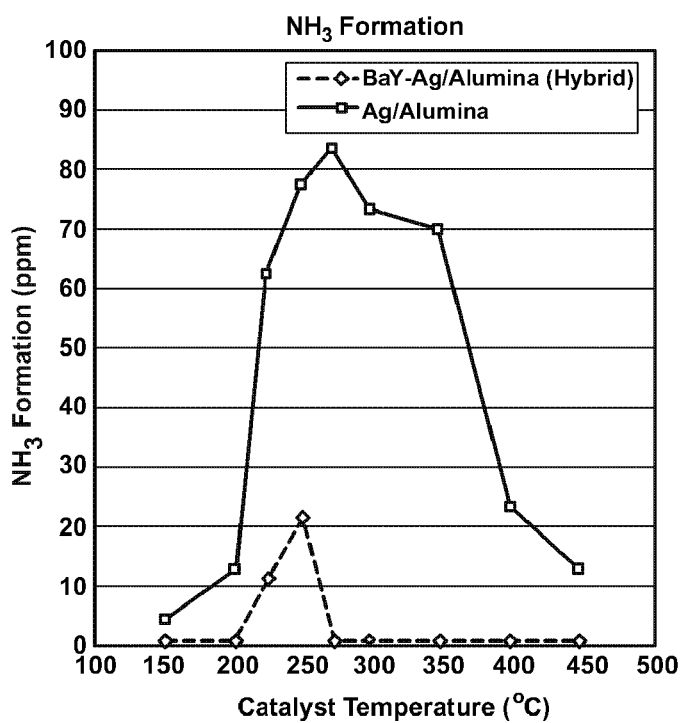
FIG. 8B is a graph comparing the NOx reduction activity of Ag/Al2O3 and BaY—Ag/Al2O3 hybrid catalysts in terms of the concomitant NH3 formation.

FIGS. 8A and 8B provide a graphic comparison of the present hybrid catalyst (BaY—Ag/Al2O3) with the base catalyst Ag/Al2O3 for NOx reduction activity, when the feed reactants contained 200 ppm NO2, 67 ppm dodecane and 400 ppm ethanol. The gas space velocity was 60,000/h over the Ag/Al2O3 base catalyst, whereas it was 30,000/h over the BaY—Ag/Al2O3 hybrid catalyst. Note that both catalysts contained the same amount of Ag/Al2O3, while the hybrid catalyst contained the extra BaY. Thus, for the case of the BaY—Ag/Al2O3 hybrid catalyst, the gas space velocity over its Ag/Al2O3 portion remained at 60,000/h. FIG. 8A compares the NOx conversion to N2, while FIG. 8B compares the concomitant NH3 formation over the two catalysts measured at the outlet of the catalyst bed. FIG. 8A clearly demonstrates that the NO2 conversion (to N2) of the present hybrid catalyst (BaY—Ag/Al2O3) greatly improves the NO2 conversion performance (to N2) of the Ag/Al2O3 catalyst, for example, in embodiments, by about 30 to about 40%. Furthermore, FIG. 8B shows that the present hybrid catalyst is extremely efficient in suppressing NH3 formation, compared to the Ag/Al2O3 catalyst. This is a highly desirable feature of the hybrid catalyst, since NH3 is a harmful air pollutant.

FIGS. 9 and 10 illustrate in schematic flow diagram form possible vehicle implementation options for the present hybrid SCR catalyst for NOx reduction in diesel engine exhaust. FIG. 9 illustrates an embodiment including use of a DOC (diesel oxidation catalyst) to oxidize some or all of NO in the engine exhaust to NO2 to make NOx (i.e., a mixture of NO and NO2). In embodiments, oxidizing NO in the exhaust stream to NO2 comprises passing air through a non-thermal plasma reactor to generate ozone-containing air plasma and adding the air plasma to the exhaust stream for oxidation of NO to NO2. In embodiments, an oxygenated hydrocarbon (OHC) is added to the exhaust stream as vapor in an air stream. Any suitable OHC can be used in embodiments herein, as used herein suitable OHC meaning alcohols and aldehydes, suitable OHCs including, but not being limited to, for example, ethanol, propanol, butanol, acetaldehyde, propionaldehyde, butyraldehyde, and mixtures and combinations thereof. In embodiments, the method herein comprises adding an OHC and a hydrocarbon to the exhaust stream, wherein the OHC and the hydrocarbon can be added to the exhaust stream separately or as a mixture or combination thereof. In embodiments, the hydrocarbon is selected from the group consisting of C8 through C20 alkanes such as octane, decane, dodecane, hexadecane, etc, and mixtures and combinations thereof. In embodiments, the OHC is ethanol and the hydrocarbon is dodecane. The OHC and hydrocarbon can be selected at any suitable ratio, for example, in embodiments, the ratio of OHC to hydrocarbon is selected at from about 0.3 to about 3.0 OHC to hydrocarbon in terms of their carbon contents.

FIG. 9 shows a system 40 in accordance with an embodiment of the present disclosure including an engine 42, a diesel oxidation catalyst 44 and a hybrid selective catalytic reduction catalyst 46. NO from engine exhaust stream 45 passes through DOC 44 and emerges as NOx containing DOC treated stream 48. In the system 40, air stream 50 is treated in plasma reactor 52 to provide ozone containing stream 54 which is fed into fuel reformer 56. Diesel fuel feed line 58 introduces diesel fuel into fuel reformer 56 and the diesel fuel and ozone are reacted to provide hydrocarbon (HC) and oxidated hydrocarbon (OHC) stream 60 which is added to NOx-containing stream 48 before the hybrid SCR catalyst 46. Assisted by the air plasma containing O3 54, the fuel reformer 56 produces OHC's such as alcohols and aldehydes from fuel HC's. The HC's and OHC's 60 from the fuel reformer 56 are injected into the engine exhaust 48 where they mix with NOx, followed by reaction over the hybrid SCR catalyst 46 producing treated stream 62 containing innocuous N2, CO2 and H2O.

An alternate system 70 in accordance with another embodiment of the present disclosure includes an engine 42 and downstream a hybrid SCR catalyst 46 as described herein. Air stream 50 is treated in plasma reactor 52 to provide ozone containing stream 54 which is fed into fuel reformer 56 and engine exhaust stream 45. Ozone containing stream 54 reacts in engine exhaust stream 45 to produce NOx containing stream 48. Diesel fuel feed line 58 introduces diesel fuel into fuel reformer 56 and the diesel fuel and ozone are reacted to provide hydrocarbon (HC) and oxidated hydrocarbon (OHC) stream 60 which is added to NOx-containing stream 48 before the hybrid SCR catalyst 46. The HC's and OHC's 60 from the fuel reformer 56 are injected into the engine exhaust 48 where they mix with NOx, followed by reaction over the hybrid SCR catalyst 46 producing treated stream 62 containing innocuous N2, CO2 and H2O. The embodiment shown in FIG. 10 is simpler than the embodiment of FIG. 9 in that the air plasma replaces the DOC to oxidize NO to NO2 in the exhaust stream.

Although not wishing to be bound by theory, the enhanced NOx reduction activity of the hybrid catalyst disclosed herein can be explained by the synergistic interaction of complementary reaction mechanisms operating on BaY and Ag/Al2O3 catalysts. In the hybrid catalyst, NO2 reacts with hydrocarbon over the BaY catalyst to produce OHC (oxygenated hydrocarbon) and NO. The NO produced from NO2 reacts subsequently with O2 over the Ag/Al2O3 catalyst to reoxidize back to NO2 which then reacts with another hydrocarbon to produce more OHC and so on, completing the synergistic interaction loop between the BaY and Ag/Al2O3 catalysts. On the other hand, OHC's such as ethanol and acetaldehyde are known to be very efficient for reducing NO2 over BaY and Ag/Al2O3 to produce N2, while producing NH3 over Ag/Al2O3 as shown in FIG. 8B. The produced NH3 subsequently reacts with NOx over the present hybrid catalyst to produce N2, thereby creating a unique NH3/SCR process that is induced by the OHC/SCR.

In embodiments, the hybrid catalyst disclosed herein is suitable for an engine exhaust stream that contains NO2 as the major NOx species. Since the major NOx species in a typical lean burn engine exhaust gas such as diesel engine exhaust is not NO2 but NO, an oxidation catalyst or a plasma reactor may be used in practice to convert NO to NO2 in the exhaust. Further, the oxygenated hydrocarbons can be produced from raw diesel fuel using a fuel reformer assisted by air plasma. See, for example, U.S. Pat. No. 7,093,429 of Byong Kwon Cho, entitled 'Reforming Diesel Fuel for NOx Reduction,' the disclosure of which is totally incorporated herein by reference, and U.S. Ser. No. 11/155,179, of Byong Cho et al., filed on Jun. 17, 2005, entitled 'Continuous Reforming of Diesel Fuel for NOx Reduction,' the disclosure of which is totally incorporated herein by reference.

In embodiments, the present hybrid NOx reduction catalyst provides improved NOx reduction efficiency of the hydrocarbon/selective catalyst reduction (SCR) or the plasma-assisted OHC/SCR for NOx emission control for diesel engine exhausts. Use of non-noble catalysts provides a cost reduction over previous technology such as LNT which requires a large amount of noble metal catalysts.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. Method for reducing nitrogen oxides including NO and $NO_2$ in an exhaust stream also comprising oxygen, carbon monoxide and hydrocarbons at a temperature above about 150° C., the method comprising:
   oxidizing NO in the exhaust stream to $NO_2$;
   adding diesel fuel hydrocarbons and their oxygenates to the exhaust stream for the reduction of nitrogen oxides; and
   contacting the exhaust stream with a hybrid reduction catalyst comprising an alkali metal or an alkaline earth metal, a zeolite, a transition metal, and a metal oxide to reduce the nitrogen oxides to $N_2$;
   wherein the hybrid reduction catalyst is prepared from one of the alkali metal and the alkali earth metal, and the zeolite, the transition metal, and the metal oxide through aqueous ion exchange and wet impregnation followed by mixing to form a homogeneous physical mixture, compressing the homogenous physical mixture to form a wafer, and annealing the wafer to form the hybrid catalyst comprising alkali metal or alkali earth metal-zeolite-transition metal/metal oxide.

2. The method of claim 1, wherein the alkali metal is selected from the group consisting of Li, Na, K, Rb, Cs, Fr, and mixtures and combinations thereof.

3. The method of claim 1, wherein the alkaline earth metal is selected from the group consisting of Be, Mg, Ca, Sr, Ba, Ra, and mixtures and combinations thereof.

4. The method of claim 1, wherein the zeolite is a large pore zeolite selected from the group consisting of ZSM-3, ZSM-4, ZSM-10, ZSM-12, ZSM-20, zeolite beta, zeolite omega, zeolite L, zeolite X, zeolite Y, REY, USY, RE-USY, mordenite, and mixtures and combinations thereof.

5. The method of claim 1, wherein the zeolite is an intermediate pore zeolite selected from the group consisting of ZSM-5, ZSM-57, SUZ-4, and mixtures and combinations thereof.

6. The method of claim 1, wherein the transition metal is selected from the group consisting of Ag, Cu, Co, Ni, Fe, Mn, Cr, Mo, V, and mixtures and combinations thereof.

7. The method of claim 1, wherein the metal oxide is selected from the group consisting of $Al_2O_3$, $SiO_2$, $TiO_2$, $SnO_2$, MgO, and mixtures and combinations thereof.

8. The method of claim 1, wherein the hybrid catalyst comprises BaY—Ag/$Al_2O_3$.

9. The method of claim 1, wherein the exhaust stream is a diesel engine exhaust stream.

10. The method of claim 1, wherein oxidizing NO in the exhaust stream to $NO_2$ comprises passing air through a non-thermal plasma reactor to generate ozone-containing air plasma and adding the air plasma to the exhaust stream for oxidation of NO to $NO_2$.

11. The method of claim 1, comprising reducing nitrogen oxides including NO and $NO_2$ in an exhaust stream also comprising oxygen, carbon monoxide and hydrocarbons at a temperature above about 200° C.

12. The method of claim 1, wherein oxidizing NO in the exhaust stream to $NO_2$ comprises treating the exhaust stream with an oxidation catalyst.

13. The method of claim 12, wherein the oxidation catalyst is selected from the group consisting of Pt, Pd, Rh, and mixtures and combinations thereof.

14. The method of claim 1, further comprising adding an OHC to the exhaust stream as vapor in an air stream.

15. The method of claim 14, wherein the OHC is selected from the group consisting of alcohols, aldehydes, and mixtures and combinations thereof.

16. The method of claim 14, wherein the OHC is an alcohol selected from the group consisting of ethanol, propanol, butanol, and mixtures and combinations thereof.

17. The method of claim 14, wherein the OHC is an aldehyde selected from the group consisting of acetaldehyde, propionaldehyde, butyraldehyde, and mixtures and combinations thereof.

18. The method of claim 1, comprising adding an OHC and a hydrocarbon to the exhaust stream, wherein the OHC and hydrocarbon can be added to the exhaust stream separately or as a mixture or combination thereof.

19. The method of claim 18, wherein the OHC is selected from the group consisting of alcohols and aldehydes, and mixtures and combinations thereof, and the hydrocarbon is selected from the group consisting of $C_8$ through $C_{20}$ alkanes, and mixtures and combinations thereof.

20. The method of claim 18, wherein the OHC is ethanol, and the hydrocarbon is dodecane.

21. The method of claim 18, wherein the ratio of OHC to hydrocarbon is from about 0.3 to about 3.0 in terms of their carbon contents.

22. The method of claim 1, wherein reducing nitrogen oxides including NO and $NO_2$ in an exhaust stream comprises a continuous NOx reduction.

23. The method of claim 22, wherein the hybrid catalyst continuously produces $NH_3$ as a by-product.

24. The method of claim 1, wherein the hybrid catalyst is a BaY—Ag/$Al_2O_3$ hybrid catalyst, the hybrid catalyst continuously produces $NH_3$ as a by-product and the produced $NH_3$ continuously reacts with NOx over the BaY—Ag/$Al_2O_3$ hybrid catalyst to produce $N_2$.

25. The method of claim 24, wherein the emission level of harmful nitrogen-containing species including $NH_3$, HCN and $N_2O$ in an outlet stream of the hybrid catalyst is suppressed or eliminated.

26. The method of claim 1, wherein the hybrid catalyst is BaY—Ag/$Al_2O_3$ prepared by mixing BaY and Ag/$Al_2O_3$ to form a homogeneous physical mixture;
compressing the homogenous physical mixture to form a wafer;
annealing the wafer to form the hybrid catalyst comprising BaY—Ag/$Al_2O_3$.

27. The method of claim 26, wherein the hybrid catalyst wafer is compressed at a pressure range of from about 5 tons to about 15 tons pressure.

28. The method of claim 26, wherein the hybrid catalyst wafer is annealed at temperature range of from about 400° C. to about 700° C. for a time period of about 5 hours to about 30 hours in air.

29. The method of claim 26, further comprising:
forming the wafer into a powder;
optionally screening the powder to a selected size.

30. Method for reducing nitrogen oxides including NO and $NO_2$ in an exhaust stream also comprising oxygen, carbon monoxide and hydrocarbons at a temperature above about 150° C., the method comprising:
oxidizing NO in the exhaust stream to $NO_2$;
adding diesel fuel hydrocarbons and their oxygenates to the exhaust stream for the reduction of nitrogen oxides; and
contacting the exhaust stream with a hybrid reduction catalyst comprising BaY—Ag/$Al_2O_3$ to reduce the nitrogen oxides to $N_2$, wherein the hybrid catalyst is prepared from an alkali metal or alkali earth metal, a zeolite, a transition metal, and a metal oxide through the aqueous ion exchange and wet impregnation followed by mixing to form a homogeneous physical mixture, compressing the homogenous physical mixture to form a wafer, and annealing the wafer to form the hybrid catalyst comprising alkali metal or alkali earth metal-zeolite-transition metal/metal oxide.

31. A NOx reduction catalyst for a hydrocarbon-fueled automotive engine operated at a fuel-lean air-to-fuel ratio, the catalyst comprising a hybrid catalyst comprising BaY—Ag/$Al_2O_3$, wherein the hybrid catalyst is prepared from an alkali metal or alkali earth metal, a zeolite, a transition metal, and a metal oxide through the aqueous ion exchange and wet impregnation followed by mixing to form a homogeneous physical mixture, compressing the homogenous physical mixture to form a wafer, and annealing the wafer to form the hybrid catalyst comprising alkali metal or alkali earth metal-zeolite-transition metal/metal oxide.

32. The hybrid catalyst of claim 31, wherein the hybrid catalyst comprises from about 10 weight percent to about 90 weight percent BaY and from about 90 weight percent to about 10 weight percent Ag/$Al_2O_3$.

33. Method for preparing a hybrid NOx reduction catalyst, the method comprising:
mixing BaY and Ag/$Al_2O_3$ to form a homogeneous physical mixture;
compressing the homogenous physical mixture to form a wafer; and
annealing the wafer to form the hybrid catalyst comprising BaY—Ag/$Al_2O_3$.

34. The method of claim 33, wherein BaY is prepared by a multiple ion exchange process using a $Ba(NO_3)_2$ precursor at a temperature of from about 20° C. to about 100° C.

35. The method of claim 33, wherein the BaY and Ag/$Al_2O_3$ are calcined prior to mixing.

36. The method of claim 33, further comprising:
forming the wafer into a powder;
optionally screening the powder to a selected size.

37. Method for reducing nitrogen oxides in an exhaust stream of an engine operating lean of stoichiometry, the method comprising:
oxidizing NO in the exhaust stream to $NO_2$;
providing an ozone-containing stream;
reforming engine fuel with the ozone-containing stream;
adding the reformed engine fuel to the exhaust stream; and
reacting the exhaust stream including the $NO_2$ and the added reformed engine fuel over a single hybrid reduction catalyst comprising one of an alkali metal and an alkaline earth metal, and a zeolite, a transition metal, and a metal oxide,
wherein the hybrid reduction catalyst is prepared from one of the alkali metal and the alkali earth metal, and the zeolite, the transition metal, and the metal oxide through aqueous ion exchange and wet impregnation followed by mixing to form a homogeneous physical mixture, compressing the homogenous physical mixture to form a wafer, and annealing the wafer to form the single hybrid reduction catalyst.

38. The method of claim 37, further comprising:
adding a portion of the ozone-containing stream to the exhaust stream; and
reacting the exhaust stream including the $NO_2$, the ozone-containing stream and the added reformed engine fuel over the single hybrid reduction catalyst.

* * * * *